United States Patent [19]
Little et al.

[11] Patent Number: 6,035,029
[45] Date of Patent: Mar. 7, 2000

[54] SYSTEM AND METHOD FOR SUBSCRIBER LINE SERVICE CONTROL

[75] Inventors: David M. Little, Columbia, Md.;
Wendell N. Sims, Woodford, Va.;
Darryl J. Wilson, Clinton; Trone T. Bishop, Jr., Burtonsville, both of Md.

[73] Assignee: Bell Atlantic Network Services, Inc., Arlington, Va.

[21] Appl. No.: 09/138,408

[22] Filed: Aug. 24, 1998

[51] Int. Cl.[7] .................................................. H04M 3/42
[52] U.S. Cl. ........................... 379/207; 379/201; 379/114
[58] Field of Search .................................. 379/112, 113, 379/114, 201, 207

[56] References Cited

U.S. PATENT DOCUMENTS

| | | |
|---|---|---|
| 5,200,993 | 4/1993 | Wheeler et al. . |
| 5,247,347 | 9/1993 | Litteral et al. . |
| 5,528,281 | 6/1996 | Grady et al. . |
| 5,774,530 | 6/1998 | Montgomery et al. .............. 379/207 X |
| 5,790,174 | 8/1998 | Richard, III et al. ............. 379/93.12 X |
| 5,809,120 | 9/1998 | Montgomery et al. ............. 379/121 X |

*Primary Examiner*—Creighton Smith
*Attorney, Agent, or Firm*—McDermott, Will & Emery

[57] ABSTRACT

A signal band width limiter is provided in a telecommunication path that includes a leased unbundled subscriber line. The limiter may be a low pass frequency filter having a band pass range set to the frequencies corresponding to subscribed services. If only POTS service is offered, the filter has a passband range for passing only telephone service signals in a POTS analog frequency range. For ISDN service, the filter has a passband range for passing only telephone service signals within a frequency range prescribed for ISDN. For higher speed data services, such as HDSL and ADSL, filters with appropriate pass bands, up to complete pass through, are provided in the subscriber communication path. As the subscribed service is changed, replacement by the appropriate passband filter readily can be made.

25 Claims, 4 Drawing Sheets

SYSTEM AND METHOD FOR SUBSCRIBER LINE SERVICE CONTROL

TECHNICAL FIELD

The present invention relates to telecommunications, more particularly to ILEC control of the level of service delivered over lines provided for CLEC service providers.

BACKGROUND OF THE INVENTION

Recent legislative and regulatory changes have been made to spur a more open service provider environment in the telecommunications industry. Subscription to local telephone service, open to competition, no longer will be limited to incumbent local exchange carriers (ILECs) such as the regional Bell Operating companies.

One aspect of this open environment policy pertains to competing local exchange carriers (CLECs) that are facility based, e.g., those competing carriers that have their own independent switching facilities. These facilities must be integrated into the public switched telephone network (PSTN) in a seamless manner from the user's perspective. The concept of user telephone number portability is basic to this end. In general, number portability refers to the ability of end users to retain their geographic or non-geographic telephone number when they change their service provider, their location, or their service. A wide application of number portability, for example, would permit a user to keep the same telephone number at the same or different location, while terminating service from one provider in favor of a new service provider, and moving from plain old telephone service (POTS) to integrated digital services network (ISDN). The Federal Communications Commission has proposed standards for local number portability (LNP) that relates to the ability of a telephone service subscriber to select or change the selection of a carrier for providing that customer's local telephone service, while still maintaining the subscriber's telephone number at the same customer premises.

FIG. 1 is a simplified diagram exemplifying a public switched telephone network in which switching facilities of both an incumbent local exchange carrier and a competing local exchange carrier are available for direct loop connection to the subscriber. A customer having telephone or like communication equipment at station 11 may obtain local exchange telephone service from either an original ILEC served by its end office 13, or a CLEC having an end office 15. The CLEC end office 15 may connect through trunk circuits to each ILEC end office in the area of service or to a trunk connection with an access tandem 23. Although not shown, the CLEC end office 15 also would connect into the common channel interoffice signaling network, at least for the exchange of call-setup related signaling messages. In the illustrated example, the subscriber at station 11, who originally received service through the ILEC has now selected the CLEC in replacement thereof for local service. Accordingly, the station 11 is shown connected to the CLEC end office 15, the previous subscriber loop connection to ILEC end office 13 having been disabled. Signaling Transfer Point (STP) 19 and Integrated Service Control Point (ISCP) are components of the known Advanced Intelligent Network (AIN) within which at least part of the common channeling signaling network is included. Various approaches have been undertaken to provide number portability for an arrangement such as this example that are not directly relevant to the present invention.

Another aspect of the open environment policy is embodied in a requirement that an ILEC unbundle certain network elements and services and offer use of those elements and services to other carriers, CLECs who may have remotely located switches but do not have facilities for direct local connection, for resale to end users. The ILEC, for example, must make available for sale to another carrier an unbundled port on an end office switch. The other carrier can then become a competing local exchange carrier by reselling services of the switch to end users having local loops that connect to the end office switch. The statutory and regulatory changes also require that customized routing be available for both unbundled switching and for resale. Customized routing is the term used in the regulations for routing calls made in the ILEC switch to locations other than normal routing locations.

Telephone service capability, of course, has extended beyond the POTS voice and ISDN communication of decades ago. With the advent of digital communications, the variety of telecommunication services and number of specialized service providers have increased at a remarkable pace. The availability of information in the form of data from various sources has spurred large public demand for broadband data transfer that challenges the capabilities of communication delivery systems. The number of information sources publicly and interactively available via the internet to personal computers, as well as private data network sources, continues to proliferate. Full motion video programming and source material also has rapidly progressed from early television broadcasting and cable distribution networks to a wide variety of distribution arrangements, including direct broadcast satellite television. The number of full motion video sources has expanded in response to increased usage and user demand for a greater range of subject matter content.

To meet user requirements, more robust broadband networks have evolved. For example, U.S. Pat. No. 5,247,347 to Litteral et al., discloses a digital video distribution network providing subscribers with access to multiple Video On Demand service providers through the public switched telephone network. The subscriber may transmit ordering information via the public switched telephone network to the independent video information providers. Video programming may be accessed and transmitted to the subscriber directly from a video information provider (VIP) or through a video buffer located at a central office (CO) serving the subscriber. Connectivity between the central office and the subscriber for transmission of video data is provided by an asymmetrical digital subscriber line (ADSL) system. ADSL, which has been standardized by ANSI as T1.413, uses existing unshielded twisted pair copper wires from the telephone company central office to the subscriber's premises. Equipment at the central office and the subscriber's premises permits transfer of more high speed digital information signals to the subscriber than in the reverse direction. The standard is directed to carrying video (broadband) to the home while returning control signals from the home at 16 Kbps.

In the Litteral et al. patent, ADSL interface units at the central office multiplex digital video information with voice information to be transmitted to the subscriber and support two-way transmission between the subscriber's line and the X.25 packet data network of one or more control channels. A subscriber may use either a standard telephone instrument over the public switched telephone network or a dedicated control device over an ISDN packet network to order video programming. The request is transmitted to a designated video information provider and digital transmission connectivity is established between the video information provider and the central office serving the subscriber. Connectivity between the central office and subscriber is provided by asymmetrical digital subscriber line interface units over a local loop. The interface units frequency multiplex digital video information with voice information to the subscriber and support transmission of a reverse transmission channel from the subscriber to the central office for transmission on the ISDN packet data network back to the video information provider. The interfaces also allow baseband signaling and audio between the central office and the subscriber for conventional telephone instrument connectivity. A complimentary ADSL interface unit at the subscriber's premises separates downstream video control signals and voice telephone signals from the line and multiplexes upstream control signals and voice telephone signals onto the line. A similar public switched telephone network multimedia information ADSL delivery system is disclosed, for example, in U.S. Pat. No. 5,528,281 to Grady et al.

ADSL offers a wide range of other applications, such as in education, health care, work-at-home access to corporate LANS and interactive services. HDSL has more recently evolved to provide T-1 capability on a normal twisted pair. Implementation may include various bit rates in either direction.

U.S. Pat. No. 5,200,993, issued Apr. 6, 1993 to Wheeler et al., describes a public telephone network distributed imaging system having enhanced capabilities. The distributed imaging system provides centralized image processing to end users and access to a range of image management capabilities residing on a shared platform distributed through a switched telephone system. The shared platform functions as a service bureau in delivering such capabilities to end users.

The distributed imaging system embodies an image platform based on the client-server model with standard communications interfaces to service multiple separate user groups accessing different applications. User groups can supply applications programs which are stored and run on the central hardware in support of respective user requirements. The image server operations are provided as functional primitives. User applications are provided by combining the primitives in a control script.

The provision of myriad services, such as those exemplified above, places a challenge on the ILEC to appropriately correlate usage of its subscribers with the various services offered so that dependable service can be provided and billing accounted therefor. With access to the final link to the subscriber available to CLECs, this challenge is further complicated. An end user may subscribe to various services through a CLEC of its choice, while provision of these subscribed services is conveyed through the plant of an ILEC. The ILEC must be able to determine whether the usage comports with its available capabilities and be able to apply the appropriate billing rates to usage that exceed the standard POTS charges. To further complicate this functionality, services may be distributed among several LECs. For example, the ILEC may continue to provide POTS service to a particular subscriber, while data services may be obtained from a different provider.

Commonly assigned co-pending application Ser. Nos. 08/598,768 and 08/598,772 to Montgomery et. al., both filed Feb. 9, 1996, are directed to utilizing portions of the existing public switched telephone network for alternate purposes, while efficiently and conveniently providing a method of measuring the usage of such circuits for billing purposes. One or more telephone company local loops to subscriber premises may be utilized in whole or in part for providing to such premises a connection to the service platform of a third party alternate service provider. The alternate service provider may be another local telephone company, an interexchange carrier, a video service provider, a multi-media service provider, or the like. The use of the local loop is leased to the third party service provider at a rate dependent upon the usage and nature of usage of the circuit. Information and data to permit efficient and convenient billing for leased usage of such loops is implemented by providing on the local loop a passive monitor. The monitor detects and temporarily stores data relating to the commencement and termination of signaling, the time of day, and the nature of the signaling that occurs. Thus, charges may be dependent not only upon the time duration of signaling, but also on the rate of information transferred. Data collected from the monitors is stored at a monitor center from which it is transferred to a billing operation such as the telephone company Revenue Accounting Office (RAO). The arrangements of these applications are reactive in nature, from the standpoint that communication activity is observed and accounted for so that appropriate billing and any other accounting functionalities can be accurately provided.

The need remains for proactively determining that appropriate service will be provided to subscribers. In the current telephone system it is difficult to determine what kind of transmission is occurring on a particular pair of wires at any given time without physically accessing the wires and measuring activity. With the current system, the ILEC, who unbundles transmission pairs to be used by CLEC customers, cannot realistically sell to the CLEC separate classes of service and be assured that a subscriber to POTS will receive only POTS service and not a higher rated service, for example, ADSL. As ADSL continues to evolve, higher data rates have become available in different classes of ADSL service offerings. Usage higher than that for which the line is subscribed not only would cost the ILEC the difference in billing for over the subscribed class of service, but also may exceed the planned transmission capacities of the ILEC plant.

A related problem exists if an unbundled line is leased to a data services provider for use only for data communication, such as ADSL. The end user would retain POTS service subscription from the ILEC through the separate original line in addition to the newly acquired data service through the leased line. The ILEC should be able to maintain control over the leased line to limit use to the subscribed level of data communication.

SUMMARY OF THE INVENTION

The present invention overcomes the aforementioned disadvantages. An advantage of the present invention is that a LEC provider can automatically limit service of a POTS subscriber to POTS only, regardless of whether the subscriber terminating link is provided by a different local exchange carrier.

An additional advantage of the present invention is that an ILEC provider can proactively limit the communication services offered over unbundled lines leased to CLECs to within prescribed signal frequency transmissions.

A further advantage of the present invention is that changes in the limitations placed on leased unbundled lines can readily be made as service offerings change.

These and other advantages are satisfied, at least in part, by the provision of a signal band width limiter in the communication path that includes the leased unbundled subscriber line. The signal limiter may be a low pass frequency filter having a band pass range set to the frequencies corresponding to the subscribed services. Thus, if only POTS service is offered, the filter has a passband range for passing only telephone service signals in a POTS analog frequency range. For ISDN service, the filter has a passband range for passing only telephone service signals within a frequency range prescribed for ISDN. For higher speed data services, such as HDSL and ADSL, filters with appropriate pass bands, up to complete pass through, are provided in the subscriber communication path. As the subscribed service is changed, replacement by the appropriate passband filter readily can be made.

The signal limiter may be located at the central office of the ILEC, such as at the main distribution frame. The CLEC may have ADSL facilities collocated with the ILEC central office. With such an arrangement, the CLEC can provide ADSL service and POTS service over the same loop or the CLEC, or other provider, can provide ADSL service to a subscriber over an unbundled ADSL loop while POTS service is provided the same subscriber over a separate POTS loop. If an unbundled loop is leased solely for a particular level of data communication service while the original POTS line remains under subscription to the ILEC, a band pass filter with the appropriate frequency range is inserted in the leased line communication path.

The ILEC central office may be equipped to provide fiber lines to remote locations such as controlled environmental vaults (CEVs) from which twisted pair may then be run to the subscriber premises. The signal limiters can be connected to distribution frames at such remote locations in lieu of central office main distribution frame connection.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout and wherein.

DETAILED DESCRIPTION OF THE INVENTION

Figure 2:
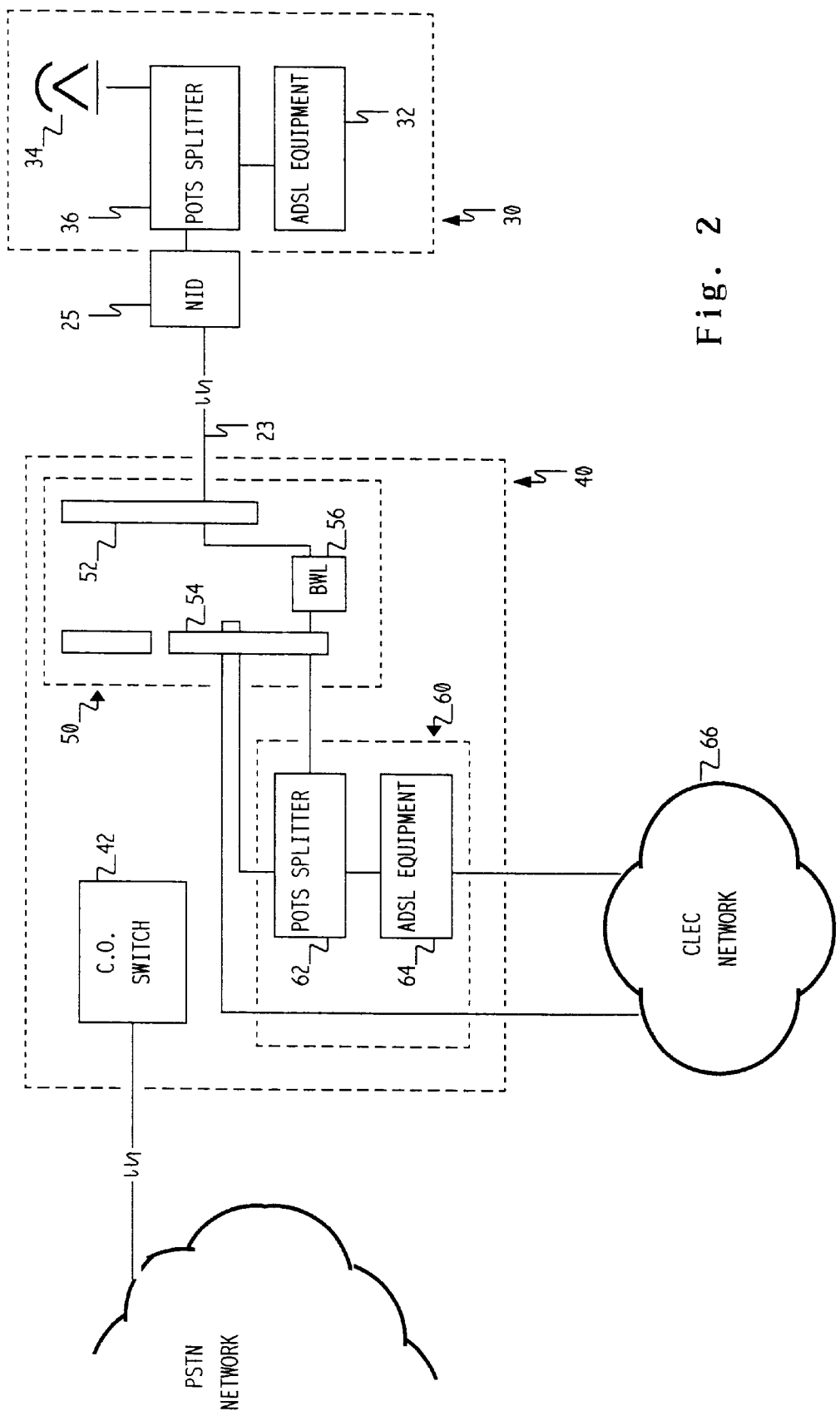
FIG. 2 is a simplified diagram of an embodiment of the present invention in which a user's only subscriber line can be leased to a competing service carrier capable of providing both POTS service and ADSL service over the same loop.

FIG. 2 is one example of an embodiment of the present invention in which an unbundled subscriber loop 23, serving customer premises 30, is leased by a competing provider from the local exchange carrier. The customer may have high speed data equipment 32, such as a computer with ADSL capability or the like, as well as standard telephony stations diagrammatically shown as telephone set 34. Access to the subscriber at the customer premises may be made through a conventional network interface device (NID) 25. POTS splitter 36, which also may be any of many conventional devices, splits analog signals for POTS communication with set 34 from the data communication delivered to equipment 32. The splitter also combines analog and data signals transmitted from the subscriber premises.

The subscriber loop is connected to distribution frame 52 of main distribution frame 50, located at the LEC central office 40. Also located at the central office are the central office switch 42 and CLEC equipment 60, comprising POTS splitter and ADSL equipment 64. The ADSL equipment, shown diagrammatically in block form at customer premises 30 and in the central office may comprise well known elements such as described, for example, in the aforementioned Litteral et al. patent. The central office switch interconnects with the public switched telephone network in conventional manner. The central office contains many other conventional elements, those which are not necessary for explanation of the current invention being deleted from the drawing for simplicity of illustration. CLEC equipment 60 is connected to frame 54 of the main distribution frame 50, as well as to its own network 66. Network 66 may comprise, in whole or in part, elements of other communication networks. While shown collocated at the LEC central office, equipment 60 may be located at a location remote from the central office 40. It is to be understood that FIG. 2 is merely illustrative and represents, for simplicity, only one subscriber and one alternate provider of many that may be served through the LEC office.

Connected between frames 52 and 54 is band width limiter 56 in a communication path that includes the subscriber line 23 and POTS splitter 62. The band width limiter serves to block signals in this path having frequencies outside the range that corresponds to subscribed services. The POTS splitter combines incoming analog POTS signals and data signals from the CLEC network that are received from different paths. Incoming POTS signals are received through the upper portion of frame 54. High speed data signals are received through the exemplary ADSL equipment 64. The combined signals are applied from the POTS splitter through the lower portion of frame 54 to the band width limiter. Outgoing signals from the subscriber line 23 travel a path through the band width limiter, lower portion of frame 54 and the POTS splitter, whereupon the signals are split for transmission of POTS signals through the upper frame portion path and the data signals through the ADSL equipment and back to the CLEC network.

The band width limiter 56 may comprise any well known filter or frequency attenuator that limits the transmission of signals to within the prescribed frequency pass band range.

In its simplest form, low pass filters such as RLC circuits can be used. The upper range limit of the particular filter to be used can be fixed by an appropriate filter circuit that correlates with the subscribed service. Filter circuits having various frequency pass ranges for the respective services can be supplied as plug-in units for easy installation at the main distribution frame.

Figure 3A:
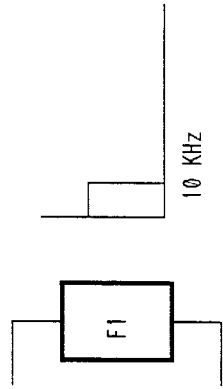
FIGS. 3(a)–3(c) are illustrations of plug-in band width limiters which may be used in the preferred embodiments of the invention.
Figure 3B:
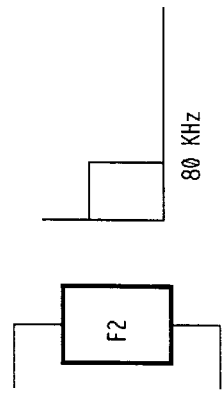
Figure 3C:
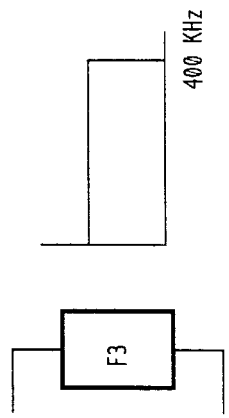
Figure 1:
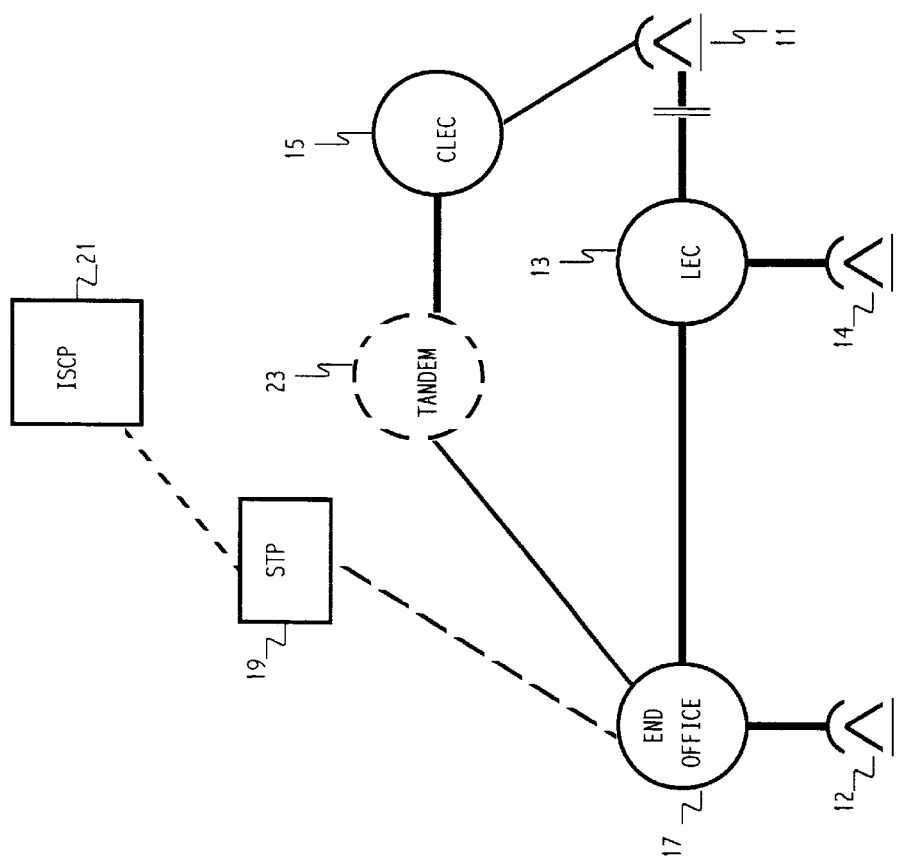
FIG. 1 is a simplified diagram exemplifying a public switched telephone network in which switching facilities of both an incumbent local exchange carrier and a competing local exchange carrier are available for direct loop connection to the subscriber.

Examples of such units are illustrated diagrammatically in FIGS. 3(a)–3(c). The low pass filter F1 of FIG. 3(a) will permit transmission of signals up to approximately 10 KHz to allow for analog POTS service to the subscriber. Such a filter, for example, may include a load coil. The low pass filter F2 of FIG. 3(b) will permit a frequency pass range of up to 80 KHz, sufficient to service a digital subscriber line (DSL) such as provided for ISDN service. The low pass filter F3 of FIG. 3(c) will permit a frequency pass range up to the level required for HDSL and ADSL frequencies. The limit of 400 KHz shown permits HDSL service.

In operation, upon establishing the subscribed level of service, the appropriate low pass filter unit can be plugged into the subscriber line at the main distribution frame. Thus, if only standard POTS service has been allocated to the subscriber line, filter F1 will be inserted in the communication path so as not to permit ADSL transmission over the subscriber line. If a service upgrade is later desired, filter F1 readily can be replaced by the appropriate plug-in F3 filter.

Figure 4:
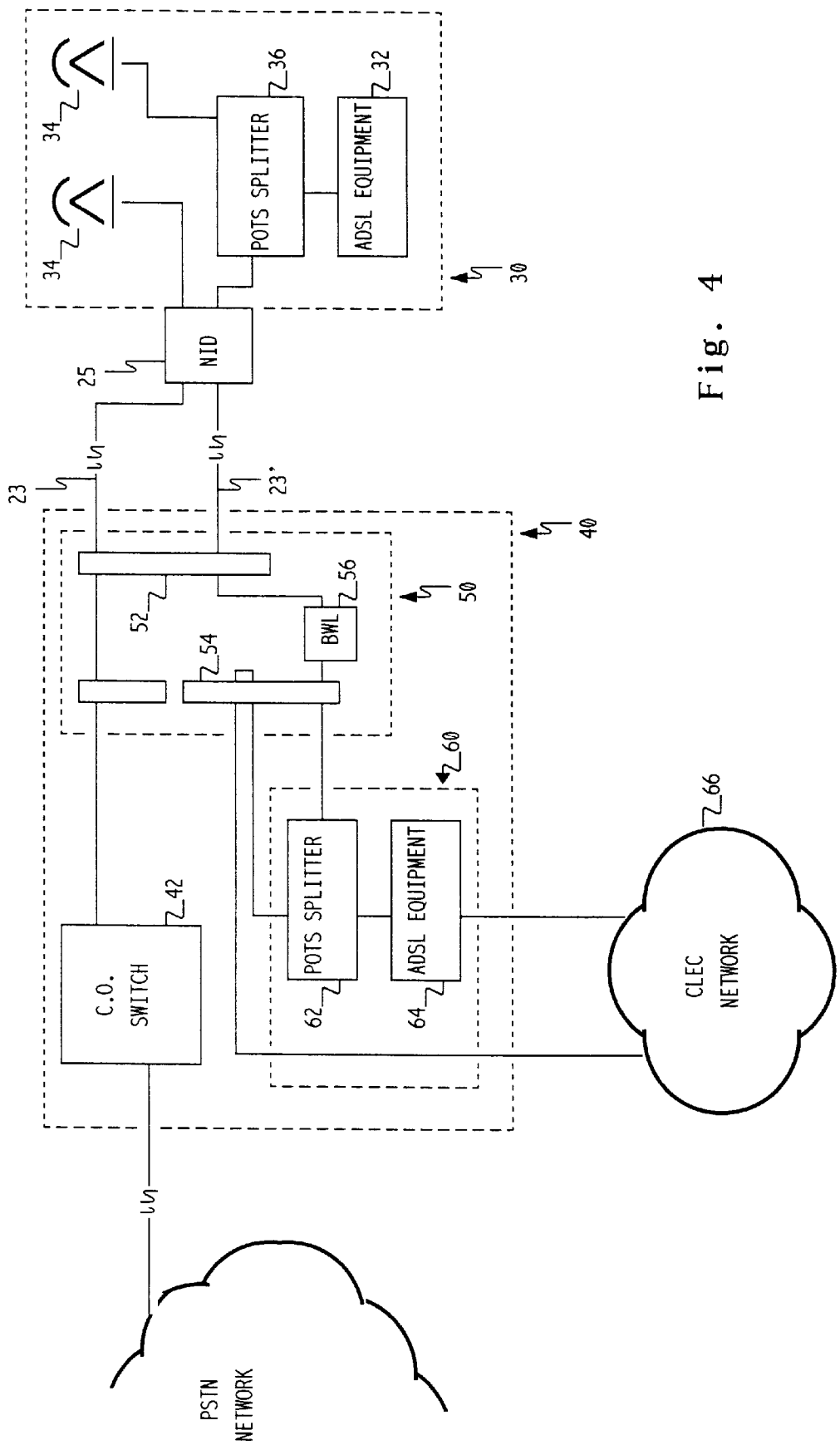
FIG. 4 is a simplified diagram of an embodiment of the present invention in which a customer premises is provided with two subscriber lines, one line receiving POTS service from an incumbent LEC, the other line leased to a competing service carrier capable of providing both POTS service and ADSL service over the same loop.

In the embodiment of FIG. 4, customer premises 30 is provided with two subscriber lines, line 23 receiving POTS service from the incumbent LEC via central office 40, line 23' leased to a CLEC capable of providing both POTS service and ADSL service over the same loop. Each of lines 23 and 23' are assigned individual telephone numbers. Line 23 is connected in conventional manner to the main distribution frame and to the switch 42 at the central office. Line 23' is arranged to be served in a manner similar to the embodiment shown in FIG. 2. The band limiter 56 may comprise the appropriate low pass filter, as described with respect to FIG. 3, that corresponds to the service subscribed from the CLEC and leased from the incumbent LEC. If the leased service is not within the ADSL standard, the appropriate band width limiter will prevent provision of ADSL service.

Line 23' alternatively may be leased only for data network services, the incumbent LEC exclusively providing POTS services over line 23. To ensure that services are conform to this arrangement, a frequency band pass limiter having filter band pass characteristics that match only the subscribed data network service(s) will be used for BWL 56. In the illustrated example, only ADSL signals will be passed over the subscriber line 23'. In this example, the CLEC POTS splitter and analog loop connection through the upper portion of frame 54 likely would be provided at the central office 40 if allocated for future use or for other subscribers.

Figure 5:
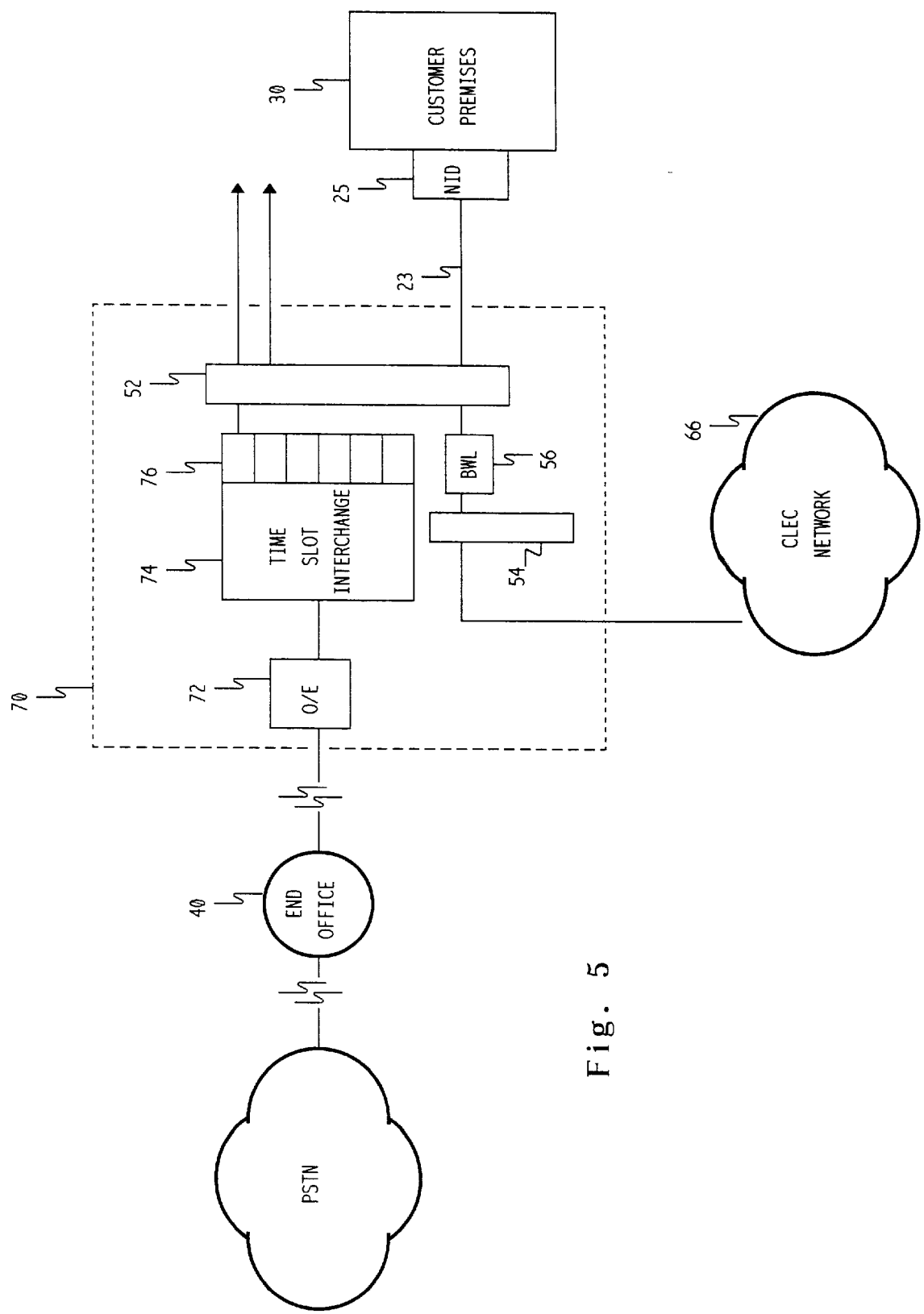
FIG. 5 is a simplified block diagram illustrative of an embodiment according to the present invention in which a CLEC leased subscriber line is connected to an incumbent LEC distribution frame located at a site remote from the central office.

FIG. 5 is a simplified block diagram of an embodiment of the invention in which subscriber lines are connected to an incumbent LEC distribution frame located at a site remote from the central office. As an example of this embodiment, the LEC end office may be equipped with fiber optic transmission capability, whereby optic fiber communication lines extend from the end office to a controlled environmental vault (CEV) 70 or like remote terminal at the remote location. O/E interface converts optical transmission signals received from the end office to electrical transmission signals which are fed to time slot interchange 74. Line cards 76 separate signals to be routed to the appropriate subscriber lines via distribution frame 52. As in the previous embodiments, subscriber line 23 is leased to a CLEC, which may have a twisted pair connection from the CLEC network to distribution frame 54 in the CEV. Band width limiter 56, connected between distribution frame portions 54 and 52, is selected to provide the appropriate frequency pass band that corresponds to the subscribed service. Plug-in units such as exemplified in FIGS. 3(a)–3(c) may be used so that the unit may readily be changed upon subscription to a different service.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. For example, the transmission path that includes the CLEC leased line may be monitored, either at the LEC central office or at a remote point in the network, to initiate an alarm in response to attempted use of the line at non-subscribed frequencies. Such an arrangement may then permit resubscription of the leased service at a higher level. An appropriate band width limiter for the new service can then replace the previous element. Also, while the embodiment of FIG. 5 is illustrative of an optical fiber portion, the remote CEV may be connected by lines such as cable and the like to the end office without departing from the concepts of this invention.

What is claimed is:

1. A device for proactively restricting use of a subscriber loop circuit, leased from an Incumbent Local Exchange Carrier (ILEC) to a competing local exchange carrier (CLEC), to signals corresponding to a predetermined loop service, said device comprising:

a first connector for electrical connection to the subscriber loop circuit;

a second connector for electrical connection to a circuit provided by the CLEC;

a filter coupled between the first and second connectors, for passing signals that correspond to the predetermined loop service and for blocking signals that do not correspond to the predetermined loop service.

2. A device as recited in claim 1, wherein the filter comprises a frequency filter for passing signals in a range of frequencies corresponding to the predetermined loop service and blocking signals having frequencies outside the range.

3. A device as recited in claim 2, wherein the filter is a lowpass filter.

4. A device as recited in claim 3, wherein the lowpass filter has a passband range for passing only analog telephone service signals.

5. A device as recited in claim 3, wherein the range of frequencies corresponds to Integrated Services Digital Network (ISDN) service.

6. A device as recited in claim 3, wherein the range of frequencies corresponds to High bit rate Digital Subscriber Line (HDSL) service.

7. A device as recited in claim 3, wherein the range of frequencies corresponds to Asymmetric Digital Subscriber Line (ADSL) service.

8. A device as recited in claim 1, wherein the first connector is for connecting to the subscriber loop circuit at a central office main distribution frame.

9. A device as recited in claim 1, wherein said predetermined loop service is a digital network service and said filter comprises a band pass filter for blocking signals that correspond to POTS analog telephone service signals.

10. In a public switched telephone network (PSTN) including at least one central switching facility associated with a local exchange carrier (LEC), said central switching facility having a switch and a main distribution frame with a plurality of ports connectable to subscriber lines that service respective end users, an improvement comprising:

a signal band width limiter connected in a communication path including said main distribution frame and one of said subscriber lines;

whereby signals that correspond to a predetermined subscribed service are transmitted through said path and signals that do not correspond to the predetermined subscribed service are blocked.

11. An improvement as recited in claim 10, wherein said signal limiter is a frequency filter.

12. An improvement as recited in claim 10, wherein said signal limiter is a low pass filter.

13. An improvement as recited in claim 12, wherein said predetermined subscribed service is plain old telephone service (POTS) and said lowpass filter has a passband range for passing only telephone service signals in a POTS analog frequency range.

14. An improvement as recited in claim 12, wherein said predetermined subscribed service is Integrated Services Digital Network (ISDN) service and said lowpass filter has a passband range for passing only telephone service signals within a frequency range prescribed for ISDN.

15. An improvement as recited in claim 12, wherein said predetermined subscribed service is High bit rate Digital Subscriber Line (HDSL) service and said lowpass filter has a passband range for passing only telephone service signals in frequency up to and including a range prescribed for HDSL.

16. An improvement as recited in claim 12, wherein said predetermined subscribed service is Asymmetric Digital Subscriber Line (ADSL) service and said lowpass filter has a passband range for passing only telephone service signals in frequency up to and including a range prescribed for ADSL.

17. An improvement as recited in claim 10, wherein said communication path includes a connection to a circuit associated with a second LEC.

18. An improvement as recited in claim 17, wherein said signal limiter is located proximate to said main distribution frame.

19. An improvement as recited in claim 17, wherein said signal limiter is located remote from said main distribution frame.

20. In a telephone communication network including a plurality of interconnected central switching facilities connected to respective subscriber lines, at least one of said central switching facilities having a switch and a main distribution frame, a method for proactively restricting use of a subscriber loop circuit, leased from an Incumbent Local Exchange Carrier (ILEC) associated with said one central switching facility, to a competing local exchange carrier (CLEC), said method comprising the steps of:

determining a prescribed level of service for said subscriber loop circuit; and limiting the band width of communication signals in said subscriber loop circuit to block transmission of signals that do not correspond to said subscribed level of service.

21. A method as recited in claim 20, wherein said prescribed level of service is plain old telephone service (POTS) and said limiting step further comprises passing only signals in a POTS analog frequency range.

22. A method as recited in claim 20, wherein said prescribed level of service is High bit rate Digital Subscriber Line (HDSL) service and said limiting step further comprises passing only in frequency up to and including a range prescribed for HDSL.

23. A method as recited in claim 20, wherein said prescribed level of service is Asymmetric Digital Subscriber Line (ADSL) service and said limiting step further comprises passing only signals in frequency up to and including a range prescribed for ADSL.

24. A method as recited in claim 20, wherein said limiting step comprises applying said communication signals to a frequency filter connected to said main distribution frame at the subscriber loop central switching facility.

25. A method as recited in claim 20, wherein said limiting step comprises applying said communication signals to a frequency filter connected to said subscriber loop circuit at a location remote from said central switching facility.

\* \* \* \* \*